(12) United States Patent
Chhabra et al.

(10) Patent No.: US 10,185,842 B2
(45) Date of Patent: Jan. 22, 2019

(54) CACHE AND DATA ORGANIZATION FOR MEMORY PROTECTION

(71) Applicant: Intel Corporation, Santa Clara, CA (US)

(72) Inventors: Siddhartha Chhabra, Hillsboro, OR (US); Raghunandan Makaram, Northborough, MA (US); Jim McCormick, Fort Collins, CO (US); Binata Bhattacharyya, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/661,044

(22) Filed: Mar. 18, 2015

(65) Prior Publication Data

US 2016/0275018 A1    Sep. 22, 2016

(51) Int. Cl.
*G06F 21/79* (2013.01)
*G06F 9/54* (2006.01)
(Continued)

(52) U.S. Cl.
CPC .................... *G06F 21/79* (2013.01)

(58) Field of Classification Search
CPC .. G06F 12/1416; G06F 12/1425; G06F 12/08; G06F 12/14; G06F 21/53;
(Continued)

(56) References Cited

U.S. PATENT DOCUMENTS 6,138,230 A    10/2000 Hervin et al.
8,171,309 B1   5/2012  Poo et al.
(Continued)

FOREIGN PATENT DOCUMENTS

KR   10-2016-0085884 A   7/2016
TW       201112853 A     4/2011
(Continued)

OTHER PUBLICATIONS

International Search Report and Written Opinion issued in corresponding PCT Application No. PCT/US2016/018266, dated Jun. 8, 2016, 13 pages.

(Continued)

*Primary Examiner* — Ashokkumar B Patel
*Assistant Examiner* — William B Jones
(74) *Attorney, Agent, or Firm* — Grossman, Tucker, Perreault & Pfleger, PLLC (57) ABSTRACT

This disclosure is directed to cache and data organization for memory protection. Memory protection operations in a device may be expedited by organizing cache and/or data structure while providing memory protection for encrypted data. An example device may comprise processing module and a memory module. The processing module may include a memory encryption engine (MEE) to decrypt encrypted data loaded from the memory module, or to encrypt plaintext data prior to storage in the memory module, using security metadata also stored in the memory module. Example security metadata may include version (VER) data, memory authentication code (MAC) data and counter data. Consistent with the present disclosure, a cache associated with the MEE may be partitioned to separate the VER and MAC data from counter data. Data organization may comprise including the VER and MAC data corresponding to particular data in the same data line.

20 Claims, 6 Drawing Sheets

(51) Int. Cl.
*H04L 9/08* (2006.01)
*H04L 29/06* (2006.01)

(58) Field of Classification Search
CPC .......... G06F 21/60; G06F 21/62; G06F 21/64; G06F 21/78; G06F 21/79; G06F 9/54; H04L 29/06; H04L 29/08
USPC ........................................ 726/21, 23, 25, 26
See application file for complete search history.

(56) References Cited

U.S. PATENT DOCUMENTS

| | | | |
|---|---|---|---|
| 8,751,828 | B1 | 6/2014 | Raizen et al. |
| 9,053,346 | B2 | 6/2015 | Chhabra et al. |
| 9,432,183 | B1 | 8/2016 | Axnix et al. |
| 9,798,900 | B2 | 10/2017 | Oh et al. |
| 2002/0169942 | A1 | 11/2002 | Hideki |
| 2003/0044007 | A1 | 3/2003 | Matthews |
| 2004/0034785 | A1 | 2/2004 | Tai et al. |
| 2004/0213370 | A1 | 10/2004 | Smallwood et al. |
| 2005/0288925 | A1 | 12/2005 | Liardet et al. |
| 2006/0005047 | A1 | 1/2006 | Lekatsa et al. |
| 2006/0028880 | A1 | 2/2006 | Mikami et al. |
| 2006/0107047 | A1 | 5/2006 | Bar-El |
| 2006/0190996 | A1 | 8/2006 | Korkishko et al. |
| 2006/0277395 | A1 | 12/2006 | Fowles |
| 2007/0011421 | A1 | 1/2007 | Keller, Jr. et al. |
| 2007/0130470 | A1 | 6/2007 | Blom et al. |
| 2007/0180272 | A1* | 8/2007 | Trezise ............... G06F 11/1448 713/193 |
| 2008/0117679 | A1 | 5/2008 | Srinivasan et al. |
| 2008/0155271 | A1 | 6/2008 | Barck et al. |
| 2009/0019317 | A1 | 1/2009 | Quach et al. |
| 2009/0019551 | A1* | 1/2009 | Haga ....................... G06F 21/57 726/27 |
| 2009/0086881 | A1 | 4/2009 | Yoon et al. |
| 2009/0113110 | A1 | 4/2009 | Chen et al. |
| 2009/0240919 | A1 | 9/2009 | Alexander et al. |
| 2010/0189064 | A1 | 7/2010 | Raveendran |
| 2010/0250965 | A1 | 9/2010 | Olson |
| 2010/0332716 | A1 | 12/2010 | Sheaffer et al. |
| 2011/0055489 | A1 | 3/2011 | Reddy et al. |
| 2011/0072242 | A1 | 3/2011 | Lee et al. |
| 2011/0110519 | A1 | 5/2011 | Suzaki et al. |
| 2011/0145482 | A1 | 6/2011 | Yu et al. |
| 2011/0289306 | A1 | 11/2011 | Khosravi et al. |
| 2012/0079283 | A1 | 3/2012 | Hashimoto |
| 2012/0278635 | A1* | 11/2012 | Hars ....................... G06F 12/14 713/193 |
| 2014/0040632 | A1 | 2/2014 | Chhabra et al. |
| 2014/0101461 | A1 | 4/2014 | Chhabra et al. |
| 2014/0208109 | A1 | 7/2014 | Trevedi et al. |
| 2014/0223197 | A1 | 8/2014 | Gueron et al. |
| 2015/0186295 | A1 | 7/2015 | Savagaonkar et al. |
| 2015/0293855 | A1 | 10/2015 | Gschwind et al. |
| 2015/0301957 | A1 | 10/2015 | Elias et al. |
| 2015/0349967 | A1* | 12/2015 | Chen ..................... H04L 9/3278 713/193 |
| 2015/0370728 | A1 | 12/2015 | Yamada et al. |
| 2016/0098215 | A1 | 4/2016 | Song et al. |
| 2016/0170889 | A1 | 6/2016 | Lee et al. |
| 2016/0179702 | A1 | 6/2016 | Chhabra et al. |
| 2016/0275018 | A1 | 9/2016 | Chhabra et al. |
| 2016/0283748 | A1 | 9/2016 | Oh et al. |
| 2017/0083724 | A1 | 3/2017 | Chhabra et al. |

FOREIGN PATENT DOCUMENTS

| | | |
|---|---|---|
| TW | 201116009 A | 5/2011 |
| WO | 2013100965 A1 | 7/2013 |
| WO | 2016153722 A1 | 9/2016 |
| WO | 2017052793 A1 | 3/2017 |

OTHER PUBLICATIONS

Haifeng, Ma, et al.: "Memory Confidentiality and Integrity Protection Method Based on Variable Length Counter", Journal of Algorithms & Computational Technology, vol. 8, No. 4, Dec. 1, 2014, pp. 421-439.
Rogers, Brian, et al.: "Using Address Independent Seed Encryption and Bonsai Merkle Trees to Make Secure Processors OS- and Performance-Friendly", 40th IEEE/ACM International Symposium om Microarchitecture, 2007, pp. 183-194.
Szefer, Jakub, et al.: "Towards Fast Hardware Memory Integrity Checking with Skewed Merkle Trees", ACM, Jun. 15, 2014, 8 pages.
Elbaz, Reouven, et al.: "TEC-Tree: A Low-Cost, Parallelizable Tree for Efficient Defense Against Memory Replay Attacks", Springer-Verlag, 2007, pp. 289-302.
Final Office Action issued in U.S. Appl. No. 14/670,061, dated Jan. 25, 2017, 21 pages.
International Search Report and Written Opinion issued in PCT Application No. PCT/US2016/019890, dated Jun. 1, 2016, 12 pages.
Office Action issued in U.S. Appl. No. 14/670,061, dated Aug. 8, 2016, 18 pages.
International Preliminary Report on Patentability and Written Opinion issued in PCT Application No. PCT/US2011/067590, dated Jul. 10, 2014, 5 pages.
International Search Report and Written Opinion issued in PCT Application No. PCT/US2011/067590, dated Aug. 27, 2012, 8 pages.
Notice of Allowance issued in U.S. Appl. No. 13/976,930, dated Feb. 9, 2015, 19 pages.
Taiwanese Office Action and Search Report issued in Taiwanese Application No. 101149324, dated Feb. 11, 2015, with English translation, 12 pages.
International Search Report and Written Opinion issued in PCT Application No. PCT/US2016/045408, dated Nov. 2, 2016, 14 pages.
Office Action issued in U.S. Appl. No. 14/863,353, dated Jun. 6, 2017, 12 pages.
U.S. Appl. No. 15/282,575, filed Sep. 30, 2016, unpublished.
Taiwanese Decision of Rejection issued in Taiwanese Application No. 101149324, dated Sep. 30, 2015, with English translation, 7 pages.
International Preliminary Report on Patentability and Written Opinion issued in PCT Application No. PCT/US2016/018266, dated Sep. 19, 2017, 9 pages.
International Search Report and Written Opinion issued in PCT Application No. PCT/US2017/049468, dated Dec. 12, 2017, 16 pages.
Notice of Allowance issued in U.S. Appl. No. 14/670,061, dated Jun. 26, 2017, 8 pages.
Office Action issued in U.S. Appl. No. 15/282,575, dated Jun. 26, 2018, 26 pages.
Supplementary European Search Report issued in European Patent Application No. 16769280, dated Jul. 19, 2018, 8 pages.
Supplementary European Search Report issued in European Patent Application No. 16765386, dated Jul. 27, 2018, 5 pages.
Yan et al., "Improving Cost, Performance, and Security of Memory Encryption and Authentication", 2013 21st International Conference on Program Comprehension (ICPC); International Symposium on computer Architecture (ISCA), IEEE, US, Jun. 17, 2016, XP05829102, ISSN: 1063-6897, DOI: 10.1109/ISCA.2006.22, ISBN: 978-0-7695-3174-8, 12 pages.

* cited by examiner

CACHE AND DATA ORGANIZATION FOR MEMORY PROTECTION

TECHNICAL FIELD

The present disclosure relates to data security, and more particularly, to a device that may realize expedited memory protection via cache partitioning and/or data organization.

BACKGROUND

Electronic data security has become an area of great focus for development as more daily transactions become computerized. Computing devices are constantly being utilized to exchange financial data, personal identification data, etc. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device, that is exchanged with a processor in the computing device, etc. is a major vulnerability.

Device manufacturers, component manufacturers, software developers, etc. continue to try to develop protective measure to combat vulnerabilities. Software-based malware detection and elimination solutions typically operate at the privilege level of an operating system (OS) in the computing device. These solutions may be effective against lower privilege attacks, but may not be able to combat higher-privileged malware like rootkits. Some hardware-based protective solutions are now emerging that are instituted very early during boot-up of a computing device, and thus may establish protective measures before malware even becomes active. Known-good protection firmware may be loaded early on during boot-up that may perform various functions such as checking whether subsequently loaded software comports with known-good versions, establishing protected areas of memory wherein data may be protected from being accessed by hostile software, etc. While the benefits of these protective measures may be apparent, at least one issue that hardware protection systems may introduce is additional processing overhead at a very low level resulting in, for example, slower overall performance for the computing device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to cache and data organization for memory protection. In general, memory protection operations in a device may be expedited (e.g., made faster) by organizing cache and/or data structure while still providing memory protection for encrypted data. An example device may include at least a processing module and a memory module. The processing module may include a memory encryption engine (MEE) to decrypt encrypted data loaded from the memory module, or to encrypt plaintext data prior to storage in the memory module, using security metadata also stored in the memory module. The security metadata may include version (VER) data, memory authentication code (MAC) data and counter data. Consistent with the present disclosure, a cache associated with the MEE may be partitioned to separate the VER and MAC data from counter data. Separating the VER and MAC data from the counter data may increase the success rate for locating data in the MEE cache, decrease the amount of security metadata loaded from memory and improve overall data processing performance. Data organization may comprise, for example, including the VER and MAC data corresponding to particular data in the same data line, which may reduce the number or reads required for memory protection, and thus, may increase data processing performance.

In at least one embodiment, an example device including memory protection may comprise a memory module and a processing module. The processing module may include at least an MEE to at least one of decrypt encrypted data loaded from the memory module using security metadata loaded from the memory module, or encrypt plaintext data prior to storage in the memory module using the security metadata. The MEE may include a partitioned cache to hold at least the security metadata.

In at least one embodiment, the processing module may comprise at least one processing core to process the plaintext data and at least one core cache to hold at least part of the plaintext data during processing. For example, the at least one processing core may be to receive the decrypted data from the MEE and provide the plaintext data to the MEE for encryption prior to storage in the memory module. The MEE may be to decrypt the encrypted data and encrypt the plaintext data using counter-mode encryption. The security metadata may comprise at least MAC data, VER data and counter data corresponding to the encrypted or plaintext data. In this regard, the MEE may further be to authenticate the encrypted data loaded from the memory module using at least the MAC data and to authenticate the VER data using at least the counter data. The MEE cache may comprise, for example, a first partition to hold the VER and MAC data. In this regard, the MEE may further be to determine that version data present in the first partition has already been authenticated. The MEE cache may also comprise a second partition to hold the counter data.

In at least one embodiment, the MAC and VER data may be stored in a data line loadable into the first partition from the memory module in a single read operation. Consistent with the present disclosure, an alternate configuration for a device capable of encrypting and decrypting data may comprise, for example, a memory module and a processing module including at least an MEE to at least one of decrypt encrypted data loaded from the memory module using security metadata loaded from the memory module, or encrypt plaintext data prior to storage in the memory module using the security metadata, wherein the security metadata includes at least MAC data and VER data corresponding to the encrypted data or plaintext data stored in a data line loadable from the memory module in a single read operation. The MEE may further comprise a cache to hold at least the security metadata. The cache may comprise a first partition to hold the MAC and VER data. The security metadata may further comprise counter data and the cache may further comprise a second partition to hold the counter data. The MEE may be to, for example, authenticate the encrypted data loaded from the memory module using at least the MAC data and to authenticate the VER data using at least the counter data. Consistent with the present disclosure, a method for memory protection may comprise, for example, receiving a request to decrypt encrypted data loaded from a memory module or to encrypt plaintext data to be stored in the memory module, determining if security metadata corresponding to the encrypted data or plaintext data already exists in a partitioned cache and decrypting the encrypted data or encrypting the plaintext data using the security metadata if it is determined that the security metadata already exists in the partitioned cache.

Figure 1:
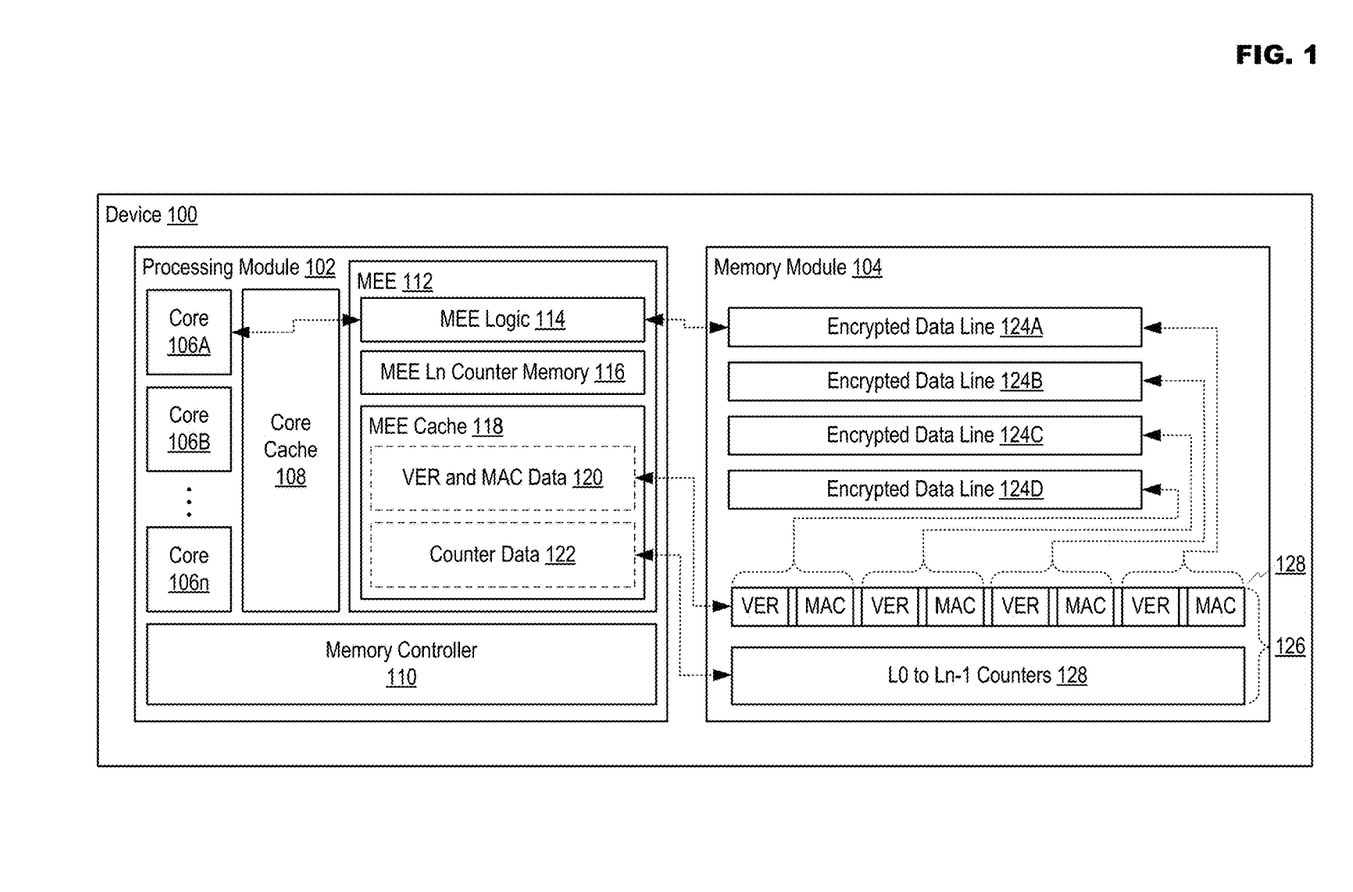
FIG. 1 illustrates an example device including cache and data organization for memory protection in accordance with at least one embodiment of the present disclosure.

FIG. 1 illustrates an example device including cache and data organization for memory protection in accordance with at least one embodiment of the present disclosure. Initially, in describing various embodiments consistent with the present disclosure reference may be made to technologies such as Software Guard Extensions (SGX) developed by the Intel Corporation, the components that may make up SGX and the manner in which SGX may operate. SGX has been employed herein to provide a readily comprehensible perspective for understanding the various disclosed embodiments, and is not intended to limit implementations to only employing SGX. Moreover, as referenced herein "memory protection" may generally comprise protecting the confidentiality of data via encryption, integrity and/or replay protection. Integrity protection may defend against attacks wherein, for example, an attacker may modify encrypted data in memory prior to decryption. Replay protection may prevent attacks wherein, for example, an attacker causes a decryption operation to be repeated to gain unauthorized access to protected data. These concepts will be discussed in more detail in regard to FIGS. 3 and 4.

An example configuration for device 100 is disclosed in FIG. 1. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc.

Example device 100 may comprise at least processing module 102 and memory module 104. In general, processing module 102 may receive data to process from memory module 104, and may return processed data to memory module 104. In at least one embodiment, the data in memory module 104 may be protected. In one example implementation, device 100 may utilize SGX to protect at least a portion of memory module 104. SGX may provide a secure, hardware-encrypted computation and storage area within system memory, the contents of which cannot be deciphered by privileged code or even through applying hardware probes to memory bus. When memory module 104 is protected by SGX it is impossible for intruders to read the contents of the secure area. Protected data cannot be observed outside of SGX, and thus, is inaccessible outside of SGX. In particular, the identity of programs (e.g., based on cryptographic hash measurements of each program's contents) may be signed and stored inside each program. When the programs are then loaded, processing module 102 may verify that a current measurement of the program is identical to a measurement previously embedded inside the program. The signature used to sign the embedded measurement is also verifiable because processing module 102 may be provided with a public key used to verify the signature at program load time. Malware cannot tamper with a protected program because its measurement would also be altered. Malware also cannot spoof the signature because the signing key is secure with the program's author. The elements that will be described below with respect to processing module 102 and memory module 104 may be used to implement security technology like SGX in device 100. However, consistent with the present disclosure, other security technologies existing now or developed in the future may also be used.

As illustrated in FIG. 1, processing module 102 may comprise, for example, at least one processing core 106 (e.g., core 106A, core 106B . . . core 106n, collectively, "cores 106A . . . n"), core cache 108, memory controller 110 and MEE 112. Cores 106A . . . n may perform various data processing operations that may utilize data stored in core cache 108. As referenced herein, a "cache" may comprise local volatile memory to hold data that may be utilized during a data processing operation. In at least one embodiment, Core cache 108 may comprise a plurality of separate memory areas organized in levels with the outmost level (e.g., from which data may be transmitted to, and received from, MEE logic 114) being the last level cache (LLC). Core cache 108 may help to speed up data processing by avoiding having to repeatedly retrieve data that may be used more than once during a data processing operation from memory module 104. Memory controller 110 may control how processing module 102 may access memory module 104, including reading data from memory module 104 and writing data to memory module 104. MEE 112 may include, for example, MEE logic 114 to perform memory protection operations, MEE Ln counter memory 116 to hold top-level counter data and MEE cache 118 to hold security metadata 126 at least during memory protection operations. In general, security metadata 126 may comprise data utilized in support of memory protection operations. Consistent with the present disclosure, core 106A may perform data processing operations requiring data secured by a protection system such as SGX. Protected data such as encrypted data line 124A, encrypted data line 124B, encrypted data line 124C and encrypted data line 124D (collectively, "encrypted data lines 124A . . . D") in memory module 104 may be retrieved by MEE logic 114 and decrypted prior to being provided to core 106A. FIG. 1 shows only four encrypted data lines 124A . . . D corresponding to VER and MAC data in a single data line 128, however, the actual number of encrypted data lines 124A . . . D in memory module 104 may depend on a variety of factors such as, for example, the size of the MEE-protected region in memory module 104. In at least one example implementation, each data line may comprise 64 B (Bytes) of data that may be stored in a protected region of memory module 104 comprising 128 MB. Likewise, data generated by core 106A that may be sensitive, confidential, etc. may be provided to MEE logic 114 for encryption prior to storage in memory module 104. In this manner, an attacker monitoring data being exchanged between processing module 102 and memory module 104 may be prevented from determining the content of certain data that may be sensitive, confidential, etc.

In at least one embodiment, MEE logic 114 may employ counter-mode encryption to decrypt encrypted data (e.g., encrypted data lines 124A . . . D) required by cores 106A . . . n, or to encrypt plaintext data generated by cores 106A . . . n, using security metadata 126 stored at least partially in memory module 104. Counter-mode encryption operates by performing an exclusive OR (XOR) between the data to be encrypted or decrypted and a "cryptopad" generated based on a seed. For example:

$$Cryptopad = AES_k(Seed) \quad (1)$$

$$Encryption = Plaintext \text{ XOR } Cryptopad \quad (2)$$

Wherein AES is an encryption operation based on the Advanced Encryption Standard and k indicates a key size specifying the number of repetitions of transformation rounds that convert the seed into the cryptopad. The protection offered by counter-mode encryption relies mostly on the uniqueness of the seed. This allows data-related operations to proceed independently of cryptographic operations related to the seed, which may improve the overall memory protection performance in that these operations may occur in parallel. Counter-mode encryption requires that the seed be unique spatially and temporarily. Spatial uniqueness may be derived from the address of the data (e.g., encrypted data line 124A) as a component of the seed. Temporal uniqueness may be achieved by associating counters with each data line, the counters being incremented when the data line is stored. The value of the counters when a data line (e.g., encrypted data line 124A) is written to memory module 104 may be deemed a version (VER), wherein the value of the counters may be usable to verify the integrity of the VER data when encrypted data line 124A is loaded from memory module 104 into processing module 102. MAC and VER data line 128 along with L0 to Ln−1 counters 128 are generally referenced herein as security metadata 126. During encryption and decryption operations, MEE logic 114 may cause at least a portion of security metadata 126 to be loaded into MEE cache 118 for use in encryption or decryption in conjunction with MEE LN Counter memory 114. The use of security metadata 126 and MEE Ln Counter memory 114 will be described in more detail in regard to FIG. 3-5.

Consistent with the present disclosure, the example disclosed in FIG. 1 comprises at least two different embodiments that may be used alone or collaboratively to expedite encryption and decryption operations in device 100. Initially, MEE cache 118 may be partitioned to include, for example, MAC and VER data in a first partition 120 and counter data 122 in a second partition 122. As will be described in regard to FIG. 5, separating these types of security metadata 126 may increase the success for finding particular MAC and VER data 120 in MEE cache 118 (e.g., corresponding to a particular encrypted data line 124A . . . D), eliminating the requirement to load security metadata from memory module 104. Not having to load data from memory module 104 may increase memory protection performance. Moreover, a second embodiment may include creating a data line structure 128 that includes both VER data and MAC data corresponding to a particular data line (e.g., corresponding to a particular encrypted data line 124A . . . D as shown in FIG. 1). As a result, fewer data lines may need to be loaded from memory module 104 for each memory protection operation, which may increase the performance of memory protection in processing module 102, and likewise the overall performance of device 100.

Figure 2:
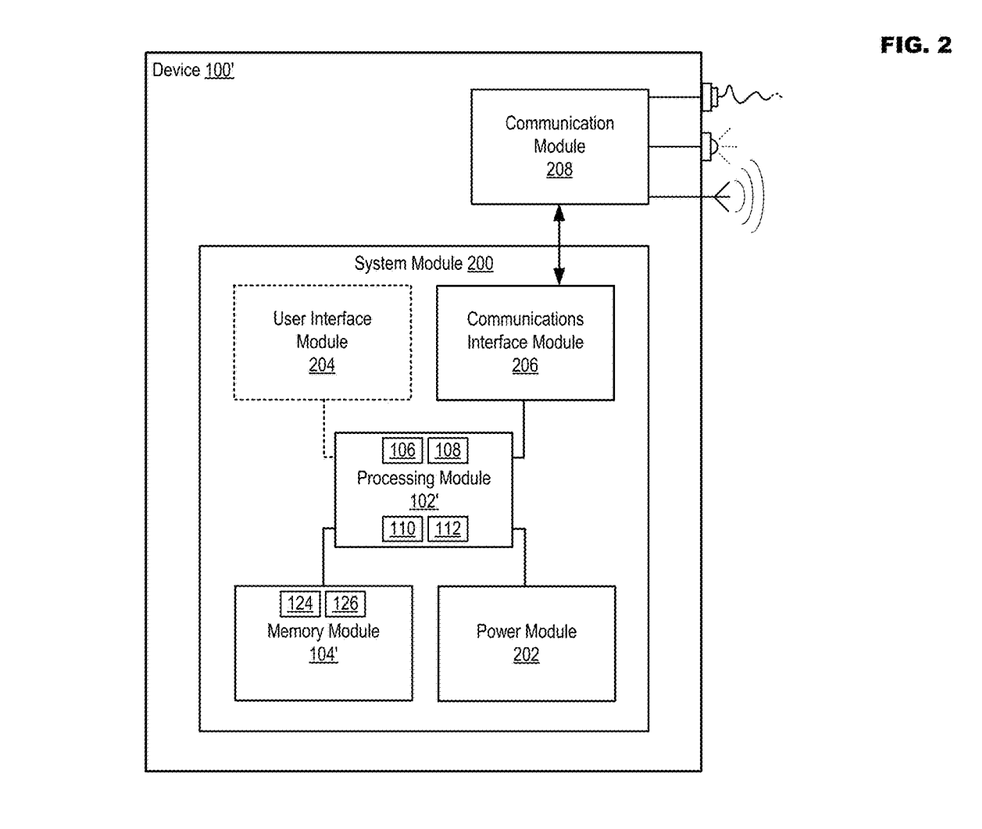
FIG. 2 illustrates an example configuration for a device usable in accordance with at least one embodiment of the present disclosure.

FIG. 2 illustrates an example configuration for a device usable in accordance with at least one embodiment of the present disclosure. The inclusion of an apostrophe after an item number (e.g., 100') may indicate that an example embodiment of the item is being shown. For example, device 100' may be capable of performing any of the activities disclosed in FIG. 1. However, device 100' is presented only as an example of an apparatus usable in embodiments consistent with the present disclosure, and is not intended to limit any of the various embodiments to any particular manner of implementation.

Device 100' may comprise, for example, system module 200 to manage operation of the device. System module 200 may include, for example, processing module 102', memory module 104', power module 202, user interface module 204 and communication interface module 206. Device 100' may further include communication module 208. While communication module 208 is illustrated as separate from system module 200, the example configuration shown in FIG. 2 has been provided merely for the sake of explanation. Some or all of the functionality associated with communication module 208 may also be incorporated into system module 200.

In device 100', processing module 102' may comprise one or more processors situated in separate components, or alternatively one or more cores 106A . . . n in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation). As shown in FIG. 2, processing module 102' may comprise at least cores 106A . . . n, core cache 108, memory controller 110, and MEE 112.

Processing module 102' may be configured to execute various instructions in device 100'. Instructions may include program code configured to cause processing module 102' to perform activities related to reading data, writing data, processing data, formulating data, converting data, transforming data, etc. Information (e.g., instructions, data, etc.) may be stored in memory module 104'. Memory module 104' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. As shown in FIG. 2, memory module 104' may comprise at least encrypted data lines 124A . . . D and security metadata 126 (e.g., VER and MAC data line 128 and L0 to Ln−1 counters 128).

Power module 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 204 may be incorporated within device 100' and/or may be coupled to device 100' via a wired or wireless communication medium. User interface module 204 may be optional in certain circumstances such as, for example, a situation wherein device 100' is a server (e.g., rack server, blade server, etc.) that does not include user interface module 204, and instead relies on another device (e.g., a management terminal) for user interface functionality.

Communication interface module 206 may be configured to manage packet routing and other control functions for communication module 208, which may include resources configured to support wired and/or wireless communications. In some instances, device 100' may comprise more than one communication module 208 (e.g., including separate physical interface modules for wired protocols and/or wireless radios) managed by a centralized communication interface module 206. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 206 may be configured to prevent wireless communications that are active in communication module 208 from interfering with each other. In performing this function, communication interface module 206 may schedule activities for communication module 208 based on, for example, the relative priority of messages awaiting transmission. While the embodiment disclosed in FIG. 2 illustrates communication interface module 206 being separate from communication module 208, it may also be possible for the functionality of communication interface module 206 and communication module 208 to be incorporated into the same module.

Figure 3:
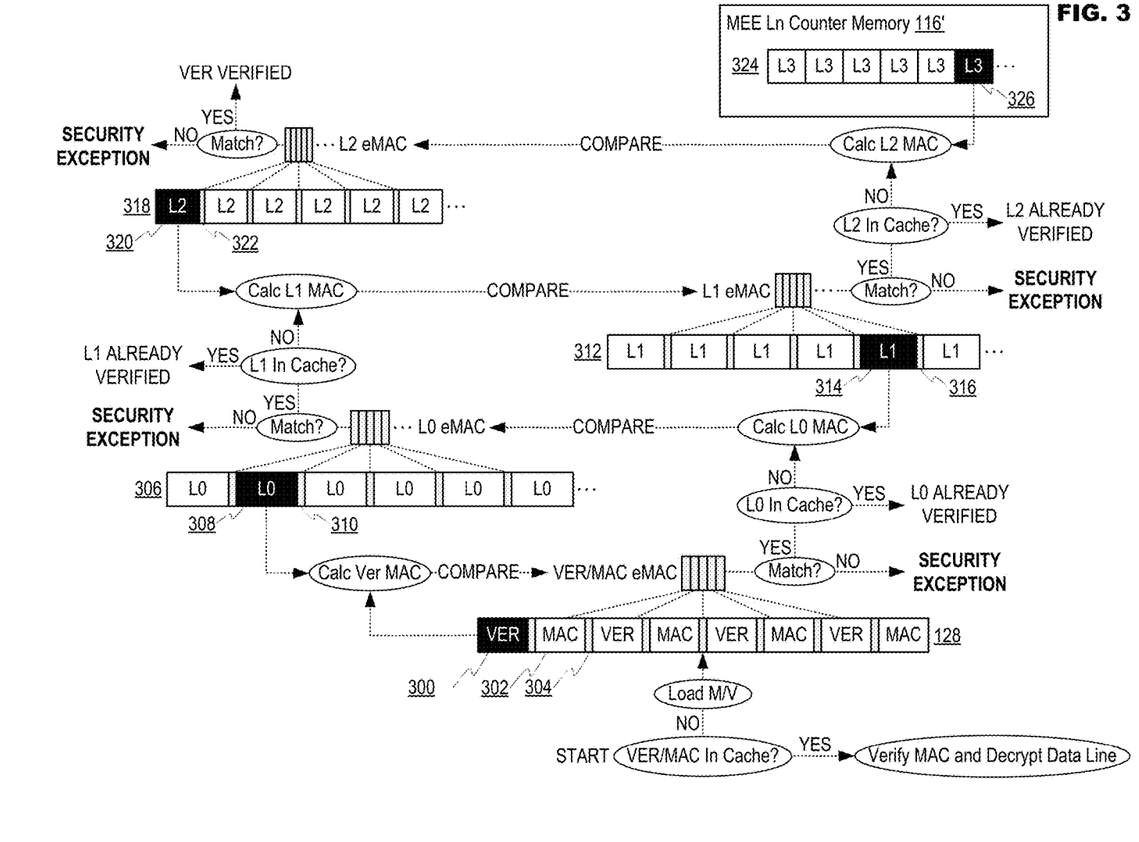
FIG. 3 illustrates an example of a tree walk associated with reading data in accordance with at least one embodiment of the present disclosure.

FIG. 3 illustrates an example of a tree walk associated with reading data in accordance with at least one embodiment of the present disclosure. Given an example wherein device 100 utilizes SGX, MEE logic 114 may comprise at least two cryptographic protection mechanisms: encryption to defend against passive attacks and integrity/replay protection to defend against active attacks. Memory encryption is designed to defend against a class of hardware attacks wherein an attacker attempts to silently observe data lines as they move in and out of processing module 102. To defend against these attacks, MEE logic 114 may employ encryption to protect memory module 104 (e.g., an MEE-specific region in memory module 104. Before a data line moves to memory module 104, it may be encrypted by MEE logic 114 (e.g., on-chip). For reads from memory module 104, encrypted data lines 124A . . . D may be decrypted by MEE logic 114 prior to being delivered to cores 106A . . . n.

Integrity and replay protection may involve defending again active attacks to data lines in memory module 104. An active attack may involve changing data stored in memory module 104 to elicit activity in device 100 that would otherwise not have happened. As shown in FIG. 3, a counter tree organization may be employed to protect the integrity and ensure replay protection of encrypted data lines 124A . . . D in memory module 104. An example counter tree may include VER and MAC data line 128, metadata nodes L0 306, L1 312 and L2 318, and top-level (e.g., L3) counters 324. In the example of FIG. 3, MAC 302 may be associated with encrypted data line 124D. When encrypted data line 124D is written back to memory module 104, MAC 302 may be updated to reflect a measurement of the contents of encrypted data line 124D currently being stored in memory. When encrypted data line 124D is later read from memory, MEE logic 114 may verify that the contents of encrypted data line 124D have not been edited since last loaded based on MAC 302. Authentication utilizing MAC 302 protects against modification attacks on encrypted data line 124D while in memory module 104, and thus, helps to ensure data integrity.

VER 300 is counter value-based "version" of encrypted data line 124D determined when encrypted data line 124D was last stored in memory module 104. VER 300 may be incremented each time encrypted data line 124D is written back to memory. Metadata nodes L0 306, L1 312 and L2 318 may comprise both counters and an embedded MAC (eMAC) computed based on the values of the counters. For example, highlighted counters 308, 314 and 320 illustrated in FIG. 3 may correspond to encrypted data line 124D. Moreover, while the eMAC has been illustrated in FIG. 3 as being stored as segments situated between the counters in L0 306, L1 312 and L2 318, this implementation is an example of how the eMAC may be stored. eMACs may be formulated using a counter from the next higher level in the tree as an input. This may continue all the way up to root or top-level L3 counters 324, which may be stored securely in processing module 102 (e.g., in an on-chip SRAM). L3 counters 324 may never be evicted from processing module 102, and thus may be protected against attacks. In essence, the counter in each node L3 324, L2 318, L1 312 and L0 306 may act as a version for a following level ending with VER/MAC node 128 storing VER 300 corresponding to encrypted data lines 124A . . . D. Hence, when encrypted data line 124D is written, all of the counters corresponding to encrypted data line 124D (including L3 counter 326 and VER 300) are updated. The eMACs in each node are also updated since eMACs are computed using the values of all counters in the node. To ensure replay-protection, when loaded from memory module 104 encrypted data line 124D may be authenticated based on MAC 302, which is formulated utilizing VER 300. VER 300 may be authenticated based on counters in nodes L0 306, L1 312 and L2 318 up to L3 counter 324. Any mismatch may indicate a potential attack and may raise a security exception, thereby defeating the attack.

Loading L0 306, L1 312 and/or L2 318 into MEE cache 118 for authenticating VER 300 corresponding to encrypted data line 124D may be deemed a "tree walk." An example tree walk is disclosed in FIG. 3. The "START" in FIG. 3 indicates that the tree walk may begin with MEE cache 118 being checked to determine if VER 300 is already present. The existence of any node (e.g., VER/MAC data line 128, L0 306, L1 312 or L2 318) in MEE cache 118 may indicate that the node has already been authenticated (e.g., in a prior tree walk for encrypted data line 124C, corresponding to another encrypted data line 124A . . . C, etc.) and that the tree walk may stop. If VER 300 is determined to exist in MEE cache 118, then MAC 302 may be verified using VER 300, and if MAC 302 is authenticated, the decryption of encrypted data line 124D may proceed. If VER 300 is not determined to be present in MEE cache 118, then the tree walk may continue.

If VER 300 is not found to already exist in MEE cache 118, then VER/MAC data line 128 may be authenticated. Authentication may comprise calculating a MAC over VER/MAC data line 128 and comparing the newly calculated MAC to VER/MAC eMAC 304. For clarification, MAC 302 resides in VER/MAC data line 128 but protects encrypted data line 124D, while V/M eMAC 304 protects VER/MAC data line 128. Calculating a MAC for VER/MAC data line 128 may involve a cryptographic process wherein, for example, an encrypted value may be generated based on the address of encrypted data line 128, the counter value of the next higher node (e.g., counter 308 in L0 node 306) and an AES key, and MAC value is then generated by hashing the cryptographic value with all of the counter values in the data line (e.g., VER/MAC data line 128). VER/MAC data line 128 may be deemed authentic when the newly calculated MAC for VER/MAC data line 128 is determined to match V/M eMAC 304. If the newly calculated MAC does not match V/M eMAC 304, then a security exception may occur. As referenced herein, a security exception may comprise any security-related operation that may intervene to prevent the security of device 100 from being compromised including, for example, halting MEE encryption and/or decryption operations for the data line (e.g., encrypted data line 124D), restricting access to a protected memory space in memory module 104, notifying other systems in device 100, etc.

A determination may then be made as to whether L0 304 was already loaded in MEE cache 118 when L0 counter value 308 was used to calculate the MAC for VER/MAC data line 128. If L0 was already in the cache, then L0 may be considered verified (e.g., authentic) and the tree walk may stop. Otherwise, the authenticity of L0 306 may need to be checked. Verifying L0 306 may involve calculating the MAC of L0 306 utilizing counter value 314 from L1 312. If the newly calculated counter value matches L0 eMAC 310, then L0 may be deemed authentic. Otherwise, if the newly computed MAC does not match L0 eMAC 310, then a security exception may occur. Similar to L0 306, a determination may be made as to whether L1 312 was already in MEE cache 118 when L1 counter 314 was used. If L1 was already in cache then L1 may be deemed authentic and the tree walk may stop. Otherwise, a new MAC may be calculated for L1 312 utilizing counter value 320 in L2 318, and the new MAC may be compared to L1 eMAC 316. If the new MAC matches L1 eMAC 316 then L1 may be deemed authentic. If the new MAC does not match L1 eMAC 316 then a security exception may be triggered. Similar to the previous two nodes, a determination may then be made as to whether L2 318 was already in MME cache 118. If L2 318 was not already in cache, then a MAC for L2 318 may be calculated using counter value 326 in L3 324. If the newly calculated MAC matches L2 eMAC 322 then the tree walk may be complete and VER 300 may be deemed verified. If the newly calculated MAC is determined not to match L2 eMAC 322, then a security exception may be triggered.

Figure 4:
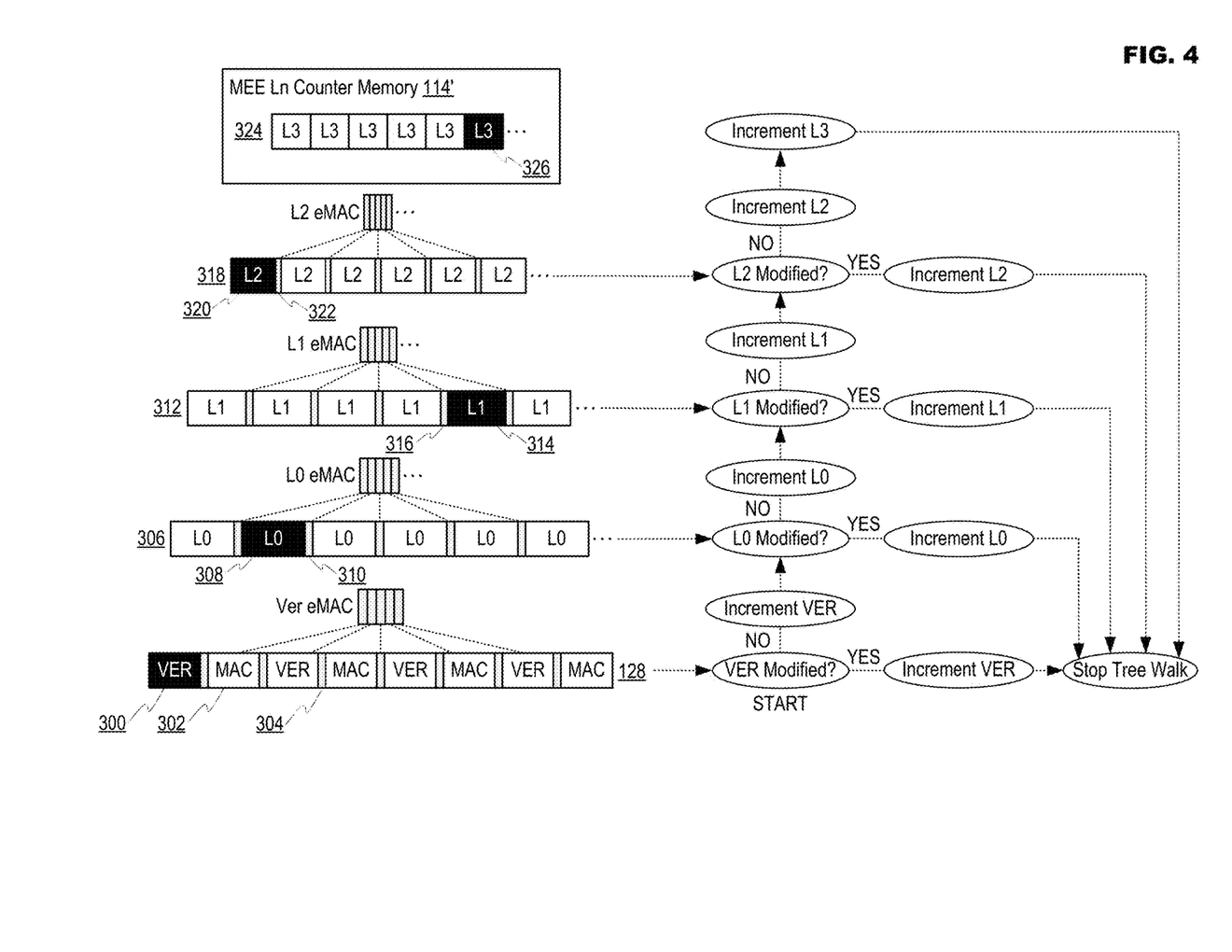
FIG. 4 illustrates an example of a tree walk associated with writing data in accordance with at least one embodiment of the present disclosure.

FIG. 4 illustrates an example of a tree walk associated with writing data in accordance with at least one embodiment of the present disclosure. In an instance wherein data is being encrypted and stored in memory module 104 (e.g., as encrypted data line 124D), each node in the replay tree must be incremented (e.g., all of the counters in the node must be incremented). However, in MEE cache 118, there may be an optimization wherein the tree walk can stop without climbing to L3 324 and without having to increment all of the associated replay tree levels. With the read flow, the walk can stop just by determining that a tree level already exists in MEE 118 cache. For a write, however, the tree walk may stop only if a node is found in a "modified" state in the cache. In at least one embodiment, in MEE cache 118 each node L2 318, L1 312 and L0 306 may maintain a bit to indicate if it was written to by a previous request. The bit being set may indicate that the copy of the node L2 318, L1 312 or L0 306 in MEE cache 118 has been modified (e.g., by another encryption request). Finding a cached node in modified state indicates that a previous write already updated the higher level nodes in the tree, and hence that the walk does not need to continue to higher levels to increment nodes. When modified nodes are evicted out MEE cache 118, the eMAC must be re-computed to reflect the latest data being written back to memory module 104. Each eMAC computation uses a counter value in the next higher level and computes the eMAC over the contents of the node corresponding to the eMAC.

The requirement to account for modified nodes in MEE cache 118 means that all of the nodes L2 318, L1 312 or L0 306 must be traversed until a determination is made that a node has been modified. As shown in FIG. 4, each node from L0 306 to L3 324 may be traversed looking for a version in MEE cache 118 that has been modified. If a node is not located in MEE cache 118 during the tree walk, it may be loaded into MEE cache 118 from memory module 104. In each level traversal the node is incremented. However, if a node is determined to be modified the tree walk stops after the modified node is incremented. If no modified nodes are found in MEE cache 118, the tree walk may stop after incrementing counter 326 in L3 324. The data line being written to memory module 104 is encrypted using the incremented VER 300. In addition, VER 300 may be used to recalculate MAC 304. Encrypted data line 124D may then be stored in memory module 104. The updated MAC 304 corresponding to the data line being written back to memory module 104 will be stored in MEE cache 118 until it is evicted at a later point in time (e.g., due to a replacement in the cache).

Figure 5:
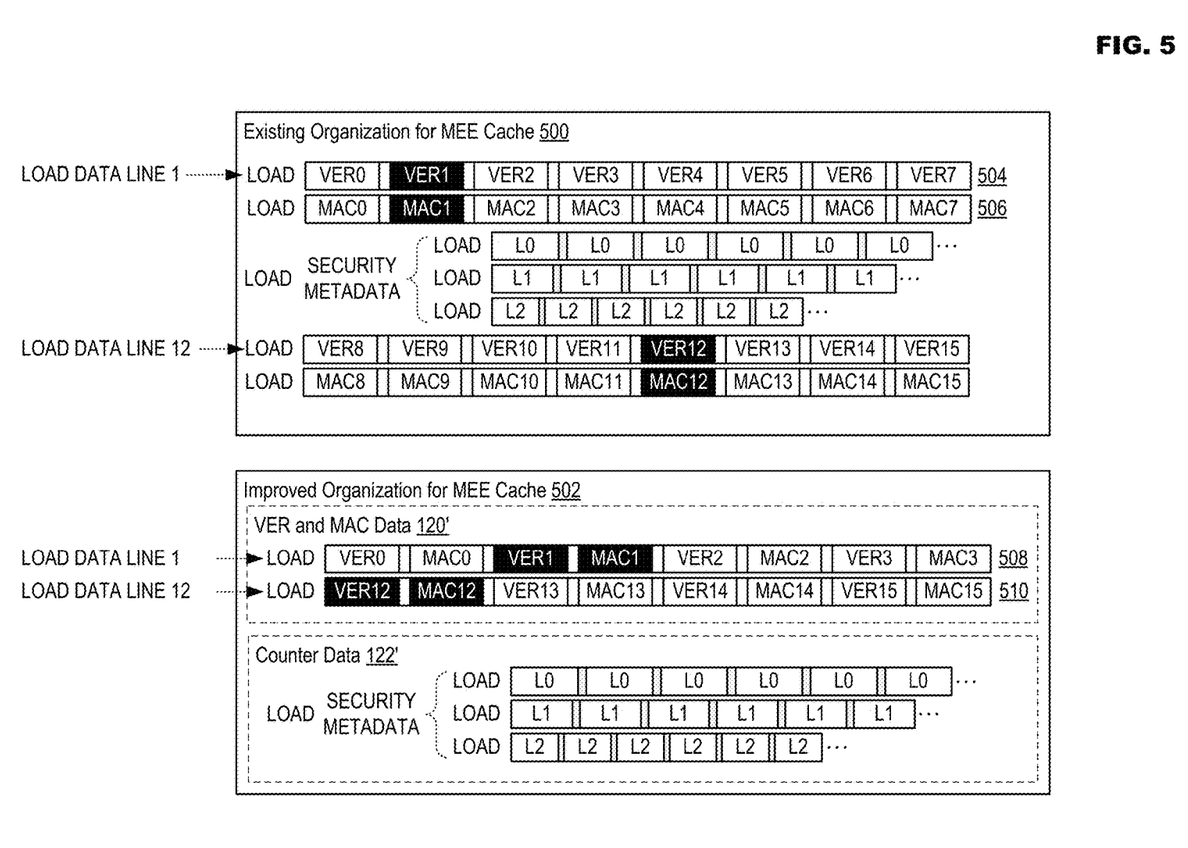
FIG. 5 illustrates examples of existing cache and data organization and improved cache and data organization in accordance with at least one embodiment of the present disclosure.

FIG. 5 illustrates examples of existing cache and data organization and improved cache and data organization in accordance with at least one embodiment of the present disclosure. Hardware-based protections systems (e.g., SGX) may operate efficiently when the number of threads (e.g., processing tasks handled by cores 106A . . . n) is limited. However, substantial processing overhead may result in situations including a large number of threads running on data servers and substantially larger working sets of serving applications. For example, the additional bandwidth required to maintain consistent performance may be as greater than seven times the bandwidth required to process the same amount of data without the protection system. As a result, existing protection systems may not be implemented on servers due to the prohibitively large bandwidth requirements that may translate into performance overhead. To make protection available across a variety of platforms, the bandwidth utilization of MEE logic 114 may be improved to allow for implementation on larger platforms such as servers. Consistent with the present disclosure, optimizations to the cache and data organization may allow for significant bandwidth savings, making hardware-based protection systems practical for implementation on larger systems. It is predicted that bandwidth overhead may be reduced by as much as ~60% (e.g., ~47% on average) and, for example, a 16 kilobyte (KB) cache may become 30% more efficient compared to a 512 KB cache resulting in significant die area and associated power savings.

At least one contributor to bandwidth overhead in devices using data protection systems such as SGX is an increase in the frequency of processing module 102 having to load data from memory module 104. A "miss stream" may be the inability for a data processor to locate data in core cache 108. A large miss stream may decrease processing performance for device 100 as each miss causes the data has to be loaded from memory module 104. The miss stream coming out of core cache 108 in a large system (e.g., a server) has very little to no spatial locality (e.g., the addresses of data being accessed are not arranged in close proximity within memory module 104). There may be different causes for this condition. For example, core cache 108 in a server may be several MBs in size, which absorbs more misses (e.g., because more data locally available in core cache 108) and makes the miss stream coming out of the last level of core cache 108 more randomized. Moreover, a large number of threads running simultaneously may cause "thrashing" in core cache 108 (e.g., the need to constantly retrieve data from memory module 104) that contributes to the miss stream generated from core cache 108 being more randomized.

Consistent with the present disclosure, MEE logic 114 operates on the miss stream coming out of core cache 108. The efficiency of MEE logic 114 may be based on the underlying assumption that the miss stream coming to MEE logic 114 will have spatial locality. In existing implementations, the each node in a replay tree may be a metadata data line with counters for eight consecutive data lines. For example, a VER 300 cache line may store the versions for eight consecutive data lines in protected memory. An example of this version line organization is shown at 504 and a similar MAC line organization is shown at 506 in example 500 of FIG. 5. When VER1 is fetched during a tree walk for a data line 1, if the seven other data lines having versions in data line 504 are also accessed (e.g., data lines 0 and 2 to 7 and corresponding to VER0 and VER2 to VER7), they will find VER data line 504 already loaded in MEE cache 118 and the walk may be terminated early, reducing the amount of accesses to memory module 104. This works well when device 100 has high spatial locality due to, for example, a small number of threads, small-sized core caches 108, etc. When device 100 is larger, more complex, etc., the absence of spatial locality means that the metadata lines 504 and 506 loaded to the MEE cache 118 seldom get utilized.

In at least one embodiment, MEE metadata (e.g., security metadata 126) may be better organized based on an observation that the miss stream coming out of MEE logic 114 has little to no spatial locality. At least two key optimizations may contribute to performance improvements, which may cut bandwidth overhead substantially (e.g. by ~50% in some instances) resulting in huge bandwidth savings compared to the base MEE design. These improvements may include reorganizing VER 300 and MAC 302 to be collocated on the same data lines and introducing partitioning into MEE cache 118 to perpetuate less thrashing and reduced miss stream rates.

In existing implementations of MEE logic 114, VER 300 and MAC 302 are placed on separate data lines 504 and 506 such as shown in example 500. The tree walk for each MEE access starts with fetching the VER 300 and MAC 302. Without spatial locality, for each memory access to memory module 104, the VER and MAC data lines 504 and 506 must be fetched separately for each access. Subsequently, when VER and MAC data lines are then loaded corresponding to data line 12 in example 500 it is easy to comprehend how MEE cache 118 can quickly become overloaded. This type of operation may result in thrashing in MEE cache 118 and may further increase the miss rate out of MEE cache 118. For example, a tree walk that may have stopped at the VER 300 level, due to MEE logic 114 locating VER 300 in MEE cache 118, may unnecessarily proceed with loading additional security metadata 126 (e.g., metadata levels L0, L1, L2, etc. corresponding to VER0 to VER7) as part of the tree walk. Loading additional security metadata 126 into MEE cache 118 may exacerbate performance issues due to delays caused by having to load data from memory module 104, increased thrashing in MEE cache 118, etc.

In at least one embodiment, MEE cache 118 may be divided into a least two partitions to, for example, separate VER 300 and MAC 302 data from counter metadata levels L0, L1, L2, etc. that are loaded to perform tree walks. Example 502 discloses a generalized example wherein VER 300 and MAC 302 data resides in partition 120' and counter data resides in partition 122'. Possible cache implementations may include, but are not limited to, logical cache partitioning, true cache partitioning or way partitioning. In logical cache partitioning a separate buffer (not shown) may be employed for caching VER 300 and MAC 302 and MEE cache 118 is used to cache only metadata levels L0, L1, L2, etc. The total capacity of the MEE cache 118 and the separate buffer may be kept the same as the typical size of MEE cache 118. In true cache partitioning the capacity of MEE cache 118 may be partitioned between the different types of security metadata 126. The cache hardware may maintain the occupancy of VER 300 and MAC 302 and level counters L0, L1, L2, etc., and may ensure that the partition is maintained by making replacement decisions based on the current occupancy of each partition. In way partitioning MEE cache 118 may be partitioned at a coarser granularity. For example, for an eight-way set associative cache, two ways may be allocated for VER 300 and MAC 302 and the remaining six ways may be allocated for the level counters L0, L1, L2, etc. Consistent with the present disclosure, the VER 300 and MAC 302 buffer may be implemented as a simple First-in-First-Out (FIFO) buffer. Other more sophisticated replacement policies like least recently used (LRU) may be also be used to improve hit rate (e.g., the percentage where VER 300 and MAC 302 data are located in MEE cache 118). While the above example cache partitioning examples describe lookup using a VER 300 and MAC 302 buffer, the data flows used in way partitioning and true cache partitioning may be derived in a straightforward manner. Separating the VER 300 and MAC 302 data from level counters L0, L1, L2, etc. may increase the hit percentage for tree walks, reduce the duration of tree walks, reduce the amount of data that needs to be loaded from memory module 104, and thus, increase the overall data processing efficiency of device 100.

With the lack of spatial locality that may be seen in larger devices 100 (e.g., servers), the majority of MEE accesses initiate with fetching data lines for both VER 300 and MAC 302 from memory module 104 such as shown at 504 and 506 in FIG. 5. In the absence of spatial locality, most of the data in data lines 504 and 506 is not utilized before being purged from MEE cache 118. This observation leads to a second organizational improvement to improve data processing efficiency wherein at least part of security metadata 126 may be altered to conserve bandwidth. This embodiment may be implemented alone or in conjunction with partitioning MEE cache 118. In at least one embodiment, corresponding VER 300 and MAC 302 data may be placed in one cache line will allow them to be fetched in one memory access, saving one additional memory access if they were placed on separate cache lines. An example of this data organization is shown in example 502 of FIG. 5 wherein metadata data line 508 corresponding to data line 1 and metadata data line 510 corresponding to data line 12 are shown. Given the size of data lines that are currently in use today, placing VER 300 and MAC 302 in the same data line would support four contiguous data lines per data cache line. However, even in the presence of spatial locality, the proposed optimization does not increase the bandwidth requirements. While fewer data lines are support, as evident in example 502 the number of reads required to load the cache data lines is cut in half and less data is being wasted (e.g., loaded into MEE cache 118 and not accessed).

Placing VER 300 and MAC 302 on the same data line may result in doubling the amount of metadata space starting from the L0 counters. This may occur because previously one L0 counter data line 304 was covering eight VER 300 segments. With the proposed optimization, one L0 counter data line 304 may cover only four VER segments. However, due to alignment requirements the regions in memory module 104 that store security metadata 126 may have gaps of unused memory space which are big enough to accommodate this increase due to the optimization. Hence, with this optimization only the transmission line cache (e.g., MEE cache 118) may need to be increased in size (e.g., doubled) to accommodate more data lines.

Figure 6:
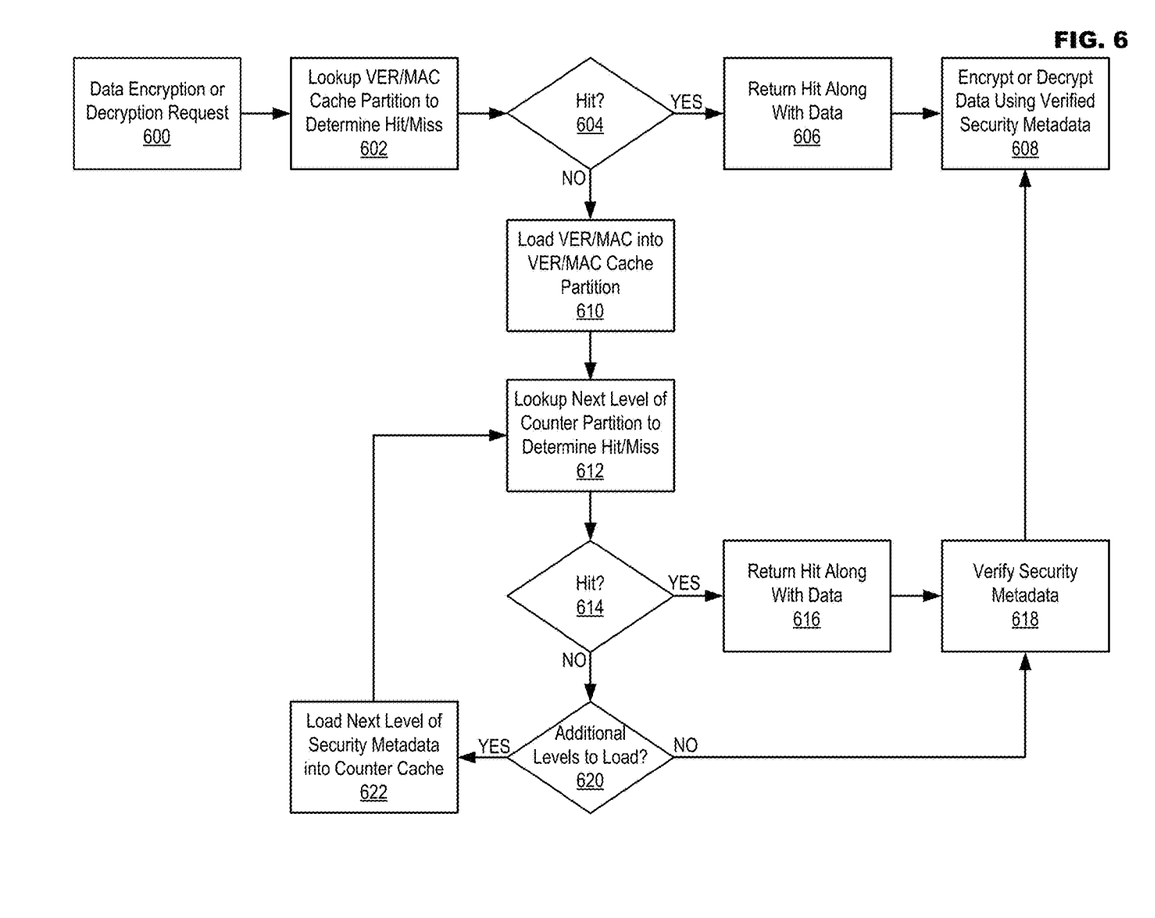
FIG. 6 illustrates example operations for memory protection in accordance with at least one embodiment of the present disclosure.

FIG. 6 illustrates example operations for memory protection in accordance with at least one embodiment of the present disclosure. In operation 600 data encryption or decryption may be triggered in a device. For example, a core in a processing module may request encrypted data from a memory module in the device, or the core may generate data that needs to be encrypted prior to storage in the memory module. A search (e.g., lookup) of a VER partition in a cache associated with an MEE may then occur in operation 602 to locate at least VER data for use in encryption or decryption. A determination may be made in operation 604 as to whether a hit occurred (e.g., whether VER data corresponding to the data line to be encrypted or decrypted was located in the VER/MAC partition). If in operation 604 it is determined that a hit occurred, then in operation 606 the hit may be returned to the MEE along with the corresponding VER data from the MEE cache. A hit in the VER/MAC partition of the MEE cache indicates that the security metadata has already been authenticated (e.g., from an encryption/decryption request for other data), and thus, that a further tree walk is not necessary. Encryption or decryption of the data using the security metadata located in operation 604 may then take place in operation 608.

Returning to operation 604, if it is determined that a miss occurred (e.g., that the VER corresponding to the data was not found in the MEE cache), then in operation 610 the VER and MAC data may be loaded from the memory module into the VER/MAC cache. A lookup for the next level of security metadata (e.g., starting with the L0 node) in a counter partition of the MEE cache may take place in operation 612. A determination may then be made in operation 614 as to whether a hit has occurred in the counter partition. If in operation 612 it is determined that a hit has occurred, then in operation 616 the hit may be returned along with the security metadata. In operation 618 any security metadata that needs to be verified may be verified. Operation 618 may then be followed by a return to operation 608 wherein data may be encrypted or decrypted using the security metadata. If in operation 614 it is determined that a hit has not occurred in the counter cache, then operations 612, 614, 620 and 622 may continue to repeat to load further security metadata counter nodes until a hit is determined in operation 614, or alternatively, in operation 620 it is determined that all security metadata has been loaded into the MEE cache. Operation 620 may be followed by a return to operation 618 to verify any security metadata that requires verification and then to operation 608 to encrypt or decrypt the data using the security metadata.

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to cache and data organization for memory protection. Encryption and decryption operations in a device may be expedited by organizing cache and/or data structure while providing memory protection for encrypted data. An example device may comprise processing module and a memory module. The processing module may include a memory encryption engine (MEE) to decrypt encrypted data loaded from the memory module, or to encrypt plaintext data prior to storage in the memory module, using security metadata also stored in the memory module. Example security metadata may include version (VER) data, memory authentication code (MAC) data and counter data. Consistent with the present disclosure, a cache associated with the MEE may be partitioned to separate the VER and MAC data from counter data. Data organization may comprise including the VER and MAC data corresponding to particular data in the same data line.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for cache and data organization for memory protection.

According to example 1 there is provided a device including memory protection. The device may comprise a memory module and a processing module including at least a memory encryption engine to at least one of decrypt encrypted data loaded from the memory module using security metadata loaded from the memory module, or encrypt plaintext data prior to storage in the memory module using the security metadata, the memory encryption engine including at least a partitioned cache to hold the security metadata.

Example 2 may include the elements of example 1, wherein the processing module comprises at least one processing core to process the plaintext data and at least one core cache to hold at least part of the plaintext data during processing.

Example 3 may include the elements of example 2, wherein the at least one processing core is to receive the decrypted data from the memory encryption engine and provide the plaintext data to the memory encryption engine for encryption prior to storage in the memory module.

Example 4 may include the elements of any of examples 1 to 3, wherein the memory encryption engine is to decrypt the encrypted data and encrypt the plaintext data using counter-mode encryption.

Example 5 may include the elements of any of examples 1 to 4, wherein the security metadata comprises at least memory authentication code data, version data and counter data corresponding to the encrypted or the plaintext data.

Example 6 may include the elements of example 5, wherein the memory encryption engine comprises a non-volatile memory to store top-level counter data.

Example 7 may include the elements of any of examples 5 to 6, wherein the memory encryption engine is to authenticate the encrypted data loaded from the memory module using at least the memory authentication code data and to authenticate the version data using at least the counter data.

Example 8 may include the elements of example 7, wherein the memory encryption engine is to authenticate the version data by performing a tree walk through the counter data loaded in the memory encryption engine cache.

Example 9 may include the elements of any of examples 5 to 8, wherein the memory encryption engine cache comprises a first partition to hold the version data and the memory authentication code data.

Example 10 may include the elements of example 9, wherein the memory encryption engine is to determine that version data present in the first partition has already been authenticated.

Example 11 may include the elements of any of examples 9 to 10, wherein the memory encryption engine cache comprises a second partition to hold the counter data.

Example 12 may include the elements of any of examples 5 to 11, wherein the memory encryption engine cache comprises a first partition to hold the version data and the memory authentication code data and a second partition to hold the counter data.

Example 13 may include the elements of any of examples 5 to 12, wherein the memory authentication code data and the version data are stored in a data line loadable into the first partition from the memory module in a single read operation.

Example 14 may include the elements of any of examples 1 to 13, wherein the processing module further comprises a memory controller.

According to example 15 there is provided a device including memory protection. The device may comprise a memory module and a processing module including at least a memory encryption engine to at least one of decrypt encrypted data loaded from the memory module using security metadata loaded from the memory module, or encrypt plaintext data prior to storage in the memory module using the security metadata, wherein the security metadata includes at least memory authentication code data and version data corresponding to the encrypted data or plaintext data stored in a data line loadable from the memory module in a single read operation.

Example 16 may include the elements of example 15, wherein the processing module comprises at least one processing core to process the plaintext data and at least one core cache to hold at least part of the plaintext data during processing.

Example 17 may include the elements of example 16, wherein the at least one processing core is to receive the decrypted data from the memory encryption engine and provide the plaintext data to the memory encryption engine for encryption prior to storage in the memory module.

Example 18 may include the elements of any of examples 15 to 17, wherein the memory encryption engine is to decrypt the encrypted data and encrypt the plaintext data using counter-mode encryption.

Example 19 may include the elements of any of examples 15 to 18, wherein the memory encryption engine comprises a cache to hold the security metadata.

Example 20 may include the elements of example 19, wherein the memory encryption engine cache comprises a first partition to hold the memory authentication code data and the version data.

Example 21 may include the elements of any of examples 19 to 20, wherein the security metadata comprises counter data and the memory encryption engine cache comprises a second partition to hold the counter data.

Example 22 may include the elements of example 21, wherein the memory encryption engine is to authenticate the encrypted data loaded from the memory module using at least the memory authentication code data and to authenticate the version data using at least the counter data.

Example 23 may include the elements of example 22, wherein the memory encryption engine is to authenticate the version data by performing a tree walk through the counter data loaded in the second partition.

Example 24 may include the elements of any of examples 21 to 23, wherein the memory encryption engine comprises a nonvolatile memory to store top-level counter data.

Example 25 may include the elements of any of examples 15 to 24, wherein the processing module further comprises a memory controller.

According to example 26 there is provided a method for memory protection. The method may comprise receiving a request to decrypt encrypted data loaded from a memory module or to encrypt plaintext data to be stored in the memory module, determining if security metadata corresponding to the encrypted data or plaintext data already exists in a partitioned cache and decrypting the encrypted data or encrypting the plaintext data using the security metadata if it is determined that the security metadata already exists in the partitioned cache.

Example 27 may include the elements of example 26, wherein the security metadata comprises memory authentication code data and version data stored in a data line loadable into the first partition from the memory module in a single read operation.

Example 28 may include the elements of example 27, wherein determining if security metadata corresponding to the encrypted data already exists in a partitioned cache comprises determining if at least the version data already exists in a first partition in the partitioned cache.

Example 29 may include the elements of any of examples 26 to 28, wherein the security metadata further comprises counter data and determining if security metadata corresponding to the encrypted data already exists in a partitioned cache comprises determining if the counter data exists in a second partition in the partitioned cache.

Example 30 may include the elements of any of examples 26 to 29, and may further comprise loading security metadata from memory if it is determined that the security metadata does not already exist in the partitioned cache and verifying the security metadata prior to encrypting or decrypting the data.

Example 31 may include the elements of example 30, wherein the verifying the security metadata comprises performing a tree walk through the security metadata loaded in the partitioned cache.

According to example 32 there is provided a system including at least one device, the system being arranged to perform the method of any of the above examples 26 to 31.

According to example 33 there is provided a chipset arranged to perform the method of any of the above examples 26 to 31.

According to example 34 there is provided at least one machine readable medium comprising a plurality of instructions that, in response to be being executed on a computing device, cause the computing device to carry out the method according to any of the above examples 26 to 31.

According to example 35 there is provided a device including memory protection, the device being arranged to perform the method of any of the above examples 26 to 31.

According to example 36 there is provided a system for memory protection. The system may comprise means for receiving a request to decrypt encrypted data loaded from a memory module or to encrypt plaintext data to be stored in the memory module, means for determining if security metadata corresponding to the encrypted data or plaintext data already exists in a partitioned cache and means for decrypting the encrypted data or encrypting the plaintext data using the security metadata if it is determined that the security metadata already exists in the partitioned cache.

Example 37 may include the elements of example 36, wherein the security metadata comprises memory authentication code data and version data stored in a data line loadable into the first partition from the memory module in a single read operation.

Example 38 may include the elements of example 37, wherein the means for determining if security metadata corresponding to the encrypted data already exists in a partitioned cache comprise means for determining if at least the version data already exists in a first partition in the partitioned cache.

Example 39 may include the elements of any of examples 36 to 38, wherein the security metadata further comprises counter data and the means for determining if security metadata corresponding to the encrypted data already exists in a partitioned cache comprise means for determining if the counter data exists in a second partition in the partitioned cache.

Example 40 may include the elements of any of examples 36 to 39, and may further comprise means for loading security metadata from memory if it is determined that the security metadata does not already exist in the partitioned cache and means for verifying the security metadata prior to encrypting or decrypting the data.

Example 41 may include the elements of example 40, wherein the means for verifying the security metadata comprises means for performing a tree walk through the security metadata loaded in the partitioned cache.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device including memory protection, comprising:
    memory circuitry in which a counter tree is stored, the counter tree being made up of metadata nodes arranged in levels, each of the metadata nodes including a plurality of counters and at least one segment of embedded memory authentication code data situated between the plurality of counters, wherein the plurality of counters are dedicated for use only by the metadata node to verify, based on values read from the plurality of counters, the integrity of version data indicating a version of encrypted data when the encrypted data is loaded into the memory circuitry, wherein values of the plurality of counters are at least one of read or incremented when traversing the levels of the counter tree; and
    processing circuitry including at least a memory encryption engine having a partitioned cache to hold security metadata, wherein the memory encryption engine is configured to at least one of:
        decrypt encrypted data loaded from the memory circuitry using the security metadata by traversing levels of the counter tree, or
        generate the security metadata for use in encrypting plaintext data prior to storage in the memory circuitry by traversing levels of a counter tree.

2. The device of claim 1, wherein the processing circuitry comprises at least one processing core to process the plaintext data and at least one core cache to hold at least part of the plaintext data during processing.

3. The device of claim 2, wherein the at least one processing core is to receive the decrypted data from the memory encryption engine and provide the plaintext data to the memory encryption engine for encryption prior to storage in the memory circuitry.

4. The device of claim 1, wherein the memory encryption engine is to decrypt the encrypted data and encrypt the plaintext data using counter-mode encryption.

5. The device of claim 1, wherein the security metadata comprises at least memory authentication code data, the version data and counter data corresponding to the encrypted or the plaintext data.

6. The device of claim 5, wherein the memory encryption engine is to authenticate the encrypted data loaded from the memory circuitry using at least the memory authentication code data.

7. The device of claim 5, wherein the memory encryption engine cache comprises a first partition to hold the version data and the memory authentication code data.

8. The device of claim 7, wherein the memory encryption engine is to determine that version data present in the first partition has already been authenticated.

9. The device if claim 7, wherein the memory encryption engine cache comprises a second partition to hold the counter data.

10. The device of claim 5, wherein the memory authentication code data and the version data are stored in a data line loadable into the first partition from the memory circuitry in a single read operation.

11. A method for memory protection, comprising:
    receiving a request to decrypt encrypted data loaded from memory circuitry or to encrypt plaintext data to be stored in the memory circuitry;
    determining if security metadata corresponding to the encrypted data or plaintext data already exists in a partitioned cache; and
    decrypting the encrypted data or encrypting the plaintext data by traversing levels of a counter tree using the security metadata if it is determined that the security metadata already exists in the partitioned cache, the counter tree being made up of metadata nodes arranged in levels, each of the metadata nodes including a plurality of counters and at least one segment of embedded memory authentication code data situated between the plurality of counters, wherein the plurality of counters are dedicated for use only by the metadata node to verify, based on values read from the plurality of counters, the integrity of version data indicating a version of encrypted data when the encrypted data is loaded into the memory circuitry, wherein values of the counters are at least one of read or incremented when traversing the levels of the counter tree.

12. The method of claim 11, wherein the security metadata comprises memory authentication code data and the version data stored in a data line loadable into a first partition from the memory circuitry in a single read operation.

13. The method of claim 12, wherein determining if security metadata corresponding to the encrypted data already exists in a partitioned cache comprises determining if at least the version data already exists in the first partition in the partitioned cache.

14. The method of claim 11, wherein the security metadata further comprises counter data and determining if security metadata corresponding to the encrypted data already exists in a partitioned cache comprises determining if the counter data exists in a second partition in the partitioned cache.

15. The method of claim 11, further comprising:
    loading security metadata from memory if it is determined that the security metadata does not already exist in the partitioned cache; and
    verifying the security metadata prior to encrypting the plaintext data or decrypting the encrypted data.

16. At least one non-transitory machine-readable storage medium having stored thereon, individually or in combination, instructions for memory protection that, when executed by one or more processors, cause the one or more processors to:
    receive a request to decrypt encrypted data loaded from memory circuitry or to encrypt plaintext data to be stored in the memory circuitry;
    determine if security metadata corresponding to the encrypted data or plaintext data already exists in a partitioned cache; and
    decrypt the encrypted data or encrypting the plaintext data by traversing levels of a counter tree using the security metadata if it is determined that the security metadata already exists in the partitioned cache, the counter tree being made up of metadata nodes arranged in levels, each of the metadata nodes including a plurality of counters and at least one segment of embedded memory authentication code data situated between the plurality of counters, wherein the plurality of counters are dedicated for use only by the metadata node to verify, based on values read from the plurality of counters, the integrity of version data indicating a version of encrypted data when the encrypted data is loaded into the memory circuitry, wherein values of the counters are at least one of read or incremented when traversing the levels of the counter tree.

17. The medium of claim 16, wherein the security metadata comprises memory authentication code data and the version data stored in a data line loadable into a first partition from the memory circuitry in a single read operation.

18. The medium of claim 17, wherein the instructions to determine if security metadata corresponding to the encrypted data already exists in a partitioned cache comprise instructions to determine if at least the version data already exists in the first partition in the partitioned cache.

19. The medium of claim 16, wherein the security metadata further comprises counter data and the instructions to determine if security metadata corresponding to the encrypted data already exists in a partitioned cache comprise instructions to determine if the counter data exists in a second partition in the partitioned cache.

20. The medium of claim 16, further comprising instructions that, when executed by one or more processors, cause the one or more processors to:

load security metadata from memory if it is determined that the security metadata does not already exist in the partitioned cache; and verify the security metadata prior to encrypting the plaintext data or decrypting the encrypted data.

* * * * *